C. T. MOORE.
CAPPING-OFF DEVICE.
APPLICATION FILED JAN. 24, 1919.
1,312,341.
Patented Aug. 5, 1919.
2 SHEETS—SHEET 1.
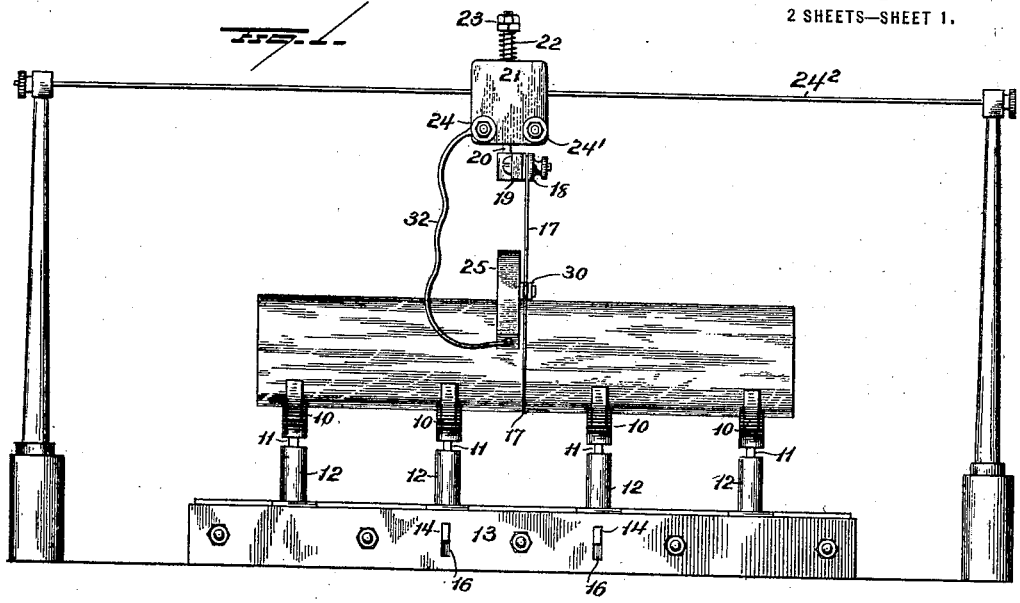
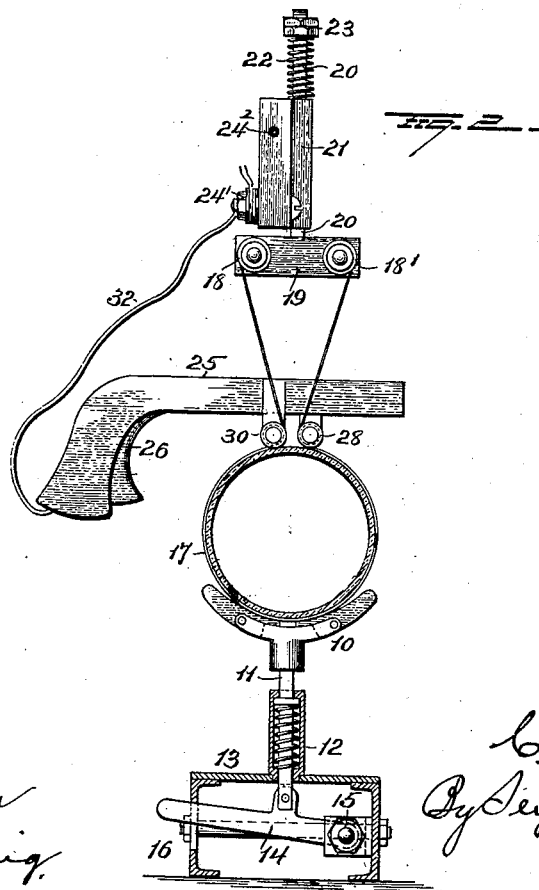

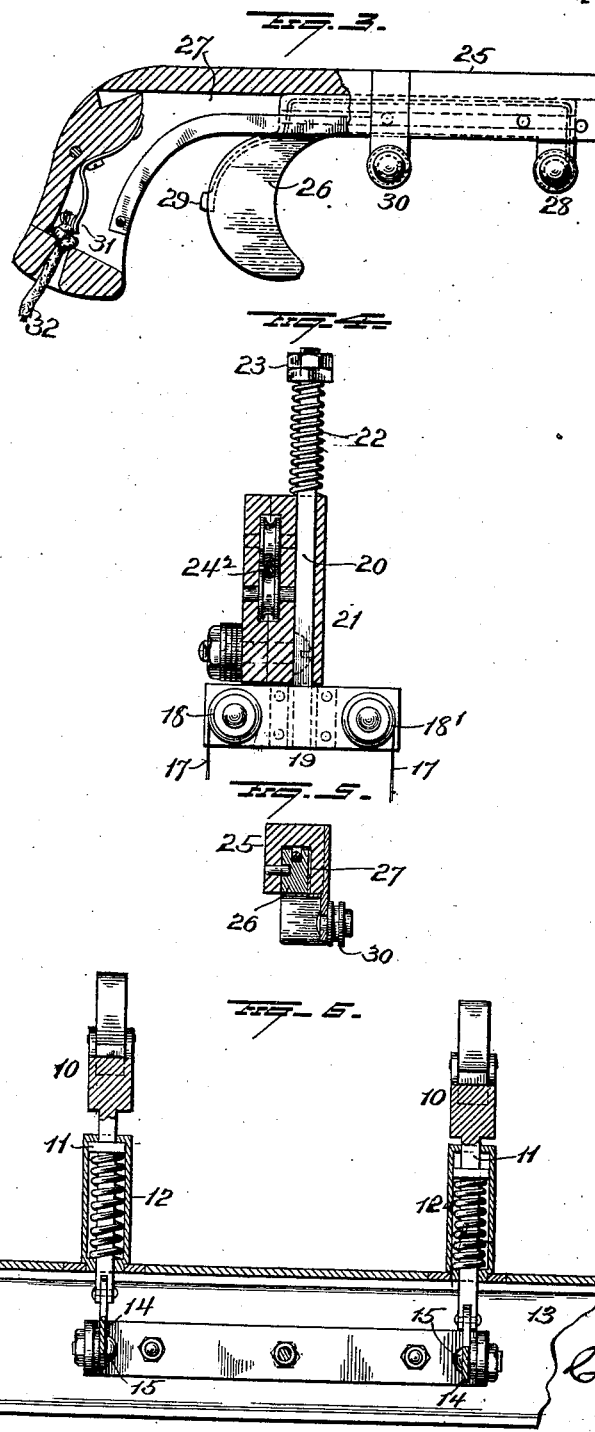

UNITED STATES PATENT OFFICE.

CHARLES T. MOORE, OF LANCASTER, OHIO, ASSIGNOR TO THE COLUMBUS GLASS COMPANY, OF LANCASTER, OHIO.

CAPPING-OFF DEVICE.

1,312,341. Specification of Letters Patent. Patented Aug. 5, 1919.

Application filed January 24, 1919. Serial No. 272,848.

*To all whom it may concern:*

Be it known that I, CHARLES T. MOORE, a citizen of the United States, and a resident of Lancaster, in the county of Fairfield and State of Ohio, have invented certain new and useful Improvements in Capping-Off Devices; and I do hereby declare the following to be a full, clear, and exact description of the invention, such as will enable others skilled in the art to which it appertains to make and use the same.

My invention relates to an improvement in apparatus for capping-off and severing glass cylinders, and it consists in the parts and combination of parts and in the details of construction as will be more fully explained and pointed out in the claims.

In the accompanying drawings, Figure 1 is a view in side elevation of apparatus embodying my invention; Fig. 2 is an enlarged view of the trolley and the severing wire; Fig. 3 is a view of the device for tightening the wire around the cylinder and for closing the circuit through the severing wire; Fig. 4 is a view in section through the trolley; Fig. 5 is a similar view through the tightener and circuit closing device, and Fig. 6 is a view in vertical section through the horse showing the means for depressing the saddles.

In the manufacture of window glass from machine drawn cylinders, the latter after being severed from the glass in the pot or tank, is taken down and deposited on a horse, after which the cap or neck of the cylinder is cut off, usually by an electrically heated capping-off wire, and the cylinder cut up into shorter lengths, which are subsequently split lengthwise, flattened, annealed and cut to the desired size.

This invention relates particularly to the means for capping-off and cutting the cylinder into lengths and to means for lowering the saddles to permit of the movement of the cutting-off wire lengthwise the cylinder.

The horse is composed of a series of saddles 10 located equi-distant apart, and each having a shank 11 mounted in an upright standard 12 on the base 13. The shanks are spring supported so as to permit the saddles to yield under load, and the shanks of the intermediate saddles, or those between the two end saddles, project below the top of the base for pivotal connection with the levers 14 which latter are pivoted at their inner ends as at 15, and project at their outer ends through slots 16 in the side of the base at which the capper-off stands while working, so that by depressing the lever, the saddle will be pulled downwardly and away from the cylinder thus permitting the cutting or severing wire 17 to be moved longitudinally of the cylinder without the necessity of elevating the latter. This wire 17 which is in the form of a depending loop, is placed under one end of the cylinder so that it will be between two saddles 10 when the cylinder is deposited on the horse, and is secured at its ends to the binding posts 18 and 18¹ on the cross head 19. The cross head is rigidly secured to the lower end of the rod 20, which is carried by the trolley 21, and projects above the latter to receive a spring 22 the upper end of which bears against the nut 23 secured to the upper end of the rod, and yieldingly holds the rod and its cross head and also the wire 17 in their elevated or highest position, the spring being sufficiently light to permit the cross head to be readily pulled down, which should be done when the cutting wire is moved from one position to another.

The spring also operates to yieldingly hold the cutting-off wire 17 up and in contact with the underside of the cylinder.

The binding posts 18 and 18¹ are insulated from each other, and one of them 18, is connected electrically with one of the leading-in or conductor wires, through which the current passes to the severing wire 17. The leading-in wire or conductor constituting the other side of the circuit is connected with the binding post 24, and the latter is electrically connected with a contact 31 in the combined wire-tightener and switch by the covered wire 32. The track 24² may constitute one of the leading-in wires in which event it would be electrically connected with one of the binding posts 24 or 24¹. Conductors other than the track may be used and if so one of said conductors will be coupled up to binding post 24 and the other to binding post 24¹ and the latter electrically connected with binding post 18 on the cross head.

The combined wire tightener and switch or circuit closer comprises a body portion 25 made of indurated fiber or other insulating material and a sliding member 26, the latter being mounted in a groove 27 in the body portion 25 and provided with a hook or trigger shaped end by which it is manipulated or moved in a direction to close the circuit through the wire as will be hereinafter explained. The sliding member 26 is provided at its free end with a projection carrying a grooved roller 28 which is connected by a wire or other electrical conductor with the contact 29 on the outer face of the trigger end of the member. The body portion 25 of the wire tightener and switch, also carries a grooved roller 30 which with the grooved roller 28 engages the opposite sides of the wire loop and operate when drawn together to pull the loop closely around the cylinder.

Body portion 25 is provided with a spring contact 31 located at the handle end of the groove therein and the contact 31 is connected by covered wire 32 with the binding post 24 on trolley 21.

With such construction it will be seen that if the grooved rollers on the combined wire tightener and switch be applied to the two sides of the wire loop above the glass cylinder, and the sliding member 26 thereof be pulled inwardly roller 28 will be moved toward roller 30 thus bringing the two sides of the wire loop 17 toward each other above the cylinder, and by holding the tightener and switch above but close to the cylinder, the wire will embrace the cylinder except for the slight gap between the two rollers, the effect of which gap can however be overcome by moving the tightener and switch back and forth so as to cause the heated wire to contact with the portion of cylinder immediately below the original gap. When the sliding member 26 has been moved to its limit, the contact 29 on the end thereof engages contact 31 on the body portion 25 and closes the circuit. Thus if the current enters the severing wires 17 at binding post 18 it will pass through the same up to the roller 28 and from the latter through suitable conductor to the contact point 29 and from thence to contact 32 and out to binding post 24, through the covered wire 32 which as before explained is connected with contact 31. It will therefore be seen that as soon as the circuit is closed by the movement of the sliding member 26, the current passes through the severing wire which is of high electrical resistance, and rapidly heats the same, the heat of the wire being communicated to the glass by contact which can then be capped off or severed in the well known manner.

In the operation of the apparatus the cylinder is deposited on the horse, and the cutting off wire placed around one end of the cylinder and moved to the point where the cylinder is to be cut. The combined wire tightener and switch is then applied to the wire above the cylinder and drawn closely around the latter by drawing in on the sliding member 26. During this operation the spring carrying the rod 20 and cross head 19 will yield to permit the two grooved rollers 28 and 30 on the wire tightener and switch to be drawn into close relation with each other so that the cutting off wire completely encircles except for the very slight gap between the two grooved rollers.

When the sliding member 26 has been drawn to the limit inwardly, the contact 29 on the inner end thereof makes contact with the contact 31 on the handle end of device and closes the circuit, thus permitting of the passage of the current through the cutting wire which rapidly heats it and the glass in contact with the wire. By simply moving the switch and tightener back and forth over the cylinder so as to bridge the gap between rollers on the switch the entire circumference of the cylinder will be heated and cracked in the usual and well known manner.

In these movements of the switch and the heating wire the cross head gives or yields under the pull and operates to hold the wire taut. After the cylinder has been cut at one point the entire cutting apparatus is moved to the next position, the intervening saddle or saddles being depressed by the foot levers to permit the wire to pass to its next position. With this arrangement all parts of the cutting apparatus are supported on the trackway out of the way and always accessible and readily movable to position along the cylinder for cutting it at any point throughout its length. After the cylinder has been cut up into shorter cylinders the latter are removed, another cylinder deposited on the horse and the operation repeated.

Having fully described my invention what I claim as new and desire to secure by Letters-Patent, is:—

1. In an apparatus for severing glass cylinders, the combination of a horse composed of a series of saddles for supporting a cylinder, means for moving intermediate saddles away from the cylinder, a looped heating wire secured at its ends to a carrier and adapted to embrace the cylinder, and means for directing the electric current through the looped wire for heating the latter.

2. In an apparatus for severing glass cylinders, the combination of a horse composed of a series of saddles for supporting a glass cylinder, the intermediate saddles of the series being movable toward and away from the cylinder, means for independently depressing the said saddles to permit of the movement of the cutting off wire lengthwise the cylinder and below the same, a loop shaped cutting off wire, carrier means for said wire and a combined wire tightener and switch for tightening the wire around the cylinder and for closing an electric circuit through the said wire loop.

3. In an apparatus for severing glass cylinders, the combination of a horse composed of a series of saddles, means for independently depressing the intermediate saddles of the series, a trolley, a looped heating wire carried by the latter, and a combined wire tightener and switch engaging the loop for closing the same around the cylinder, and for closing an electric circuit through said looped wire whereby the latter will be heated.

4. In an apparatus for severing glass cylinders, the combination of a horse composed of a series of saddles, means for lowering the intermediate saddles of the series, a trolley mounted to travel above the saddles, a looped heating wire carried by the trolley and means for tightening the wire loop around a glass cylinder on the horse and for closing an electric circuit through the loop.

5. A glass severing tool comprising an elevated carrier, a looped wire secured at its ends to said carrier and connected at one end with an electrical conductor, and a combined wire tightener and switch adapted to engage the two sides of the wire loop above the glass cylinder for tightening it around the latter and for closing the circuit through that portion of the loop surrounding the cylinder, the said tightener and switch having electrical connection with the other side of said electrical conductor.

6. A glass severing tool comprising a trolley, a cross head yieldingly supported on said trolley, a heating wire connected at its ends to said cross head, and a combined wire tightener and switch adapted to engage the loop for tightening the same around a glass cylinder and for closing an electric circuit through that portion of the loop in contact with said cylinder.

7. Glass severing apparatus comprising an overhead track, a trolley thereon, a cross head yieldably carried by the trolley, a heating wire loop secured at its ends to said cross head and a combined wire tightener and switch adapted to engage the loop for tightening the same around the glass cylinder and for closing an electric circuit through the wire loop.

8. Glass severing apparatus comprising an elevated track, a trolley thereon, a cross head yieldingly and adjustably carried by the trolley, a heating wire loop secured at its ends to said cross head, and a combined wire tightener and switch for tightening the wire loop around the cylinder and for closing an electric circuit through the said loop.

In testimony whereof, I have signed this specification in the presence of two subscribing witnesses.

CHAS. T. MOORE.

Witnesses:
J. H. CAMPBELL,
H. A. WACHTER.

Copies of this patent may be obtained for five cents each, by addressing the "Commissioner of Patents, Washington, D. C."